July 23, 1963  A. ZAHA  3,098,257
CASTER WHEEL FOR TRAILERS
Filed May 17, 1960  2 Sheets-Sheet 1
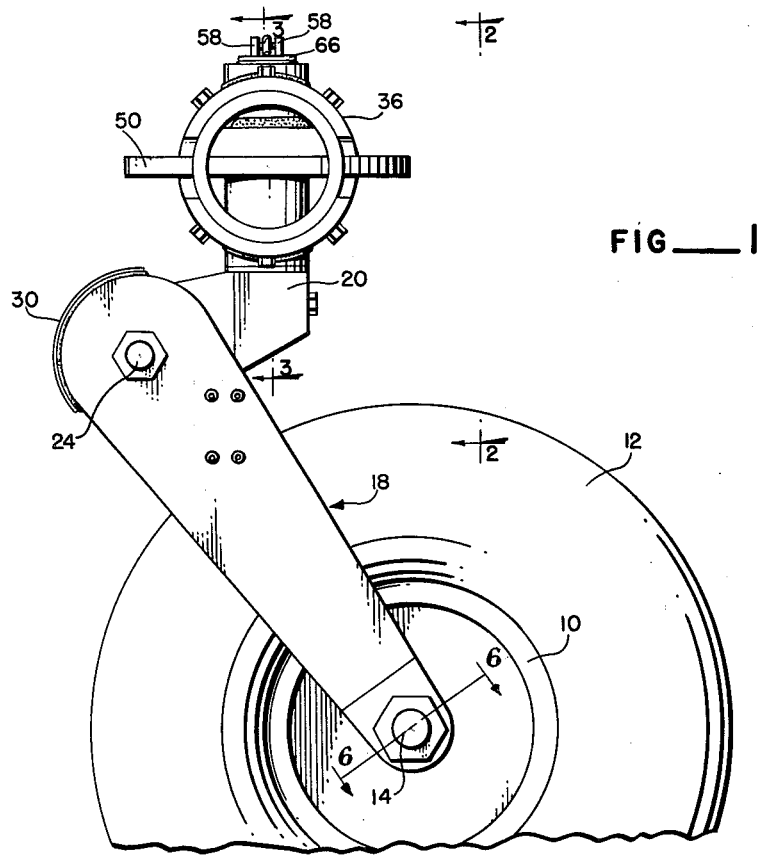
FIG—1
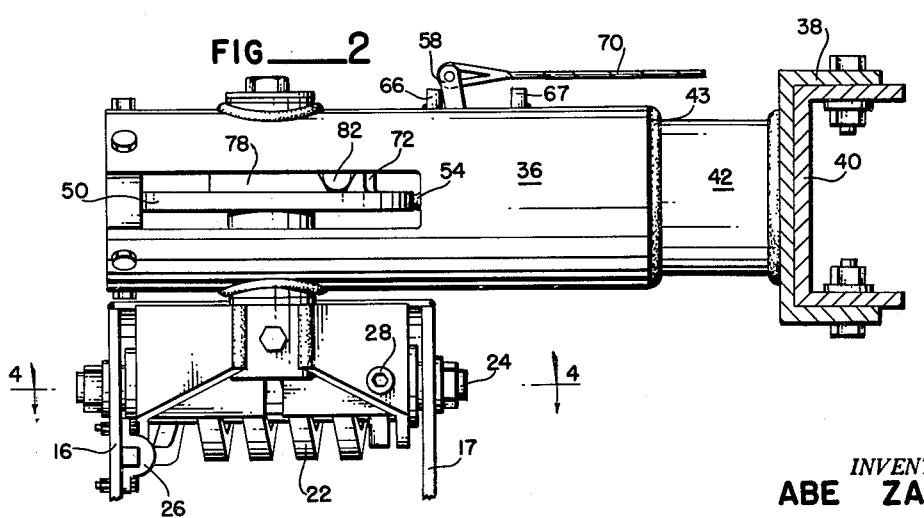
FIG—2
INVENTOR.
ABE ZAHA
BY
Smith & Tuck July 23, 1963 A. ZAHA 3,098,257
CASTER WHEEL FOR TRAILERS
Filed May 17, 1960 2 Sheets-Sheet 2
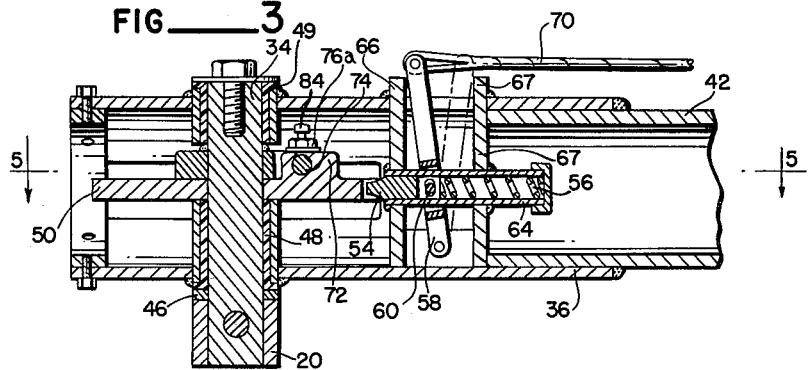
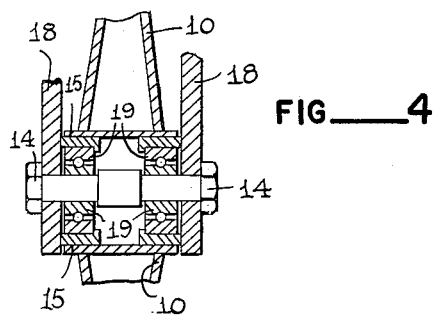
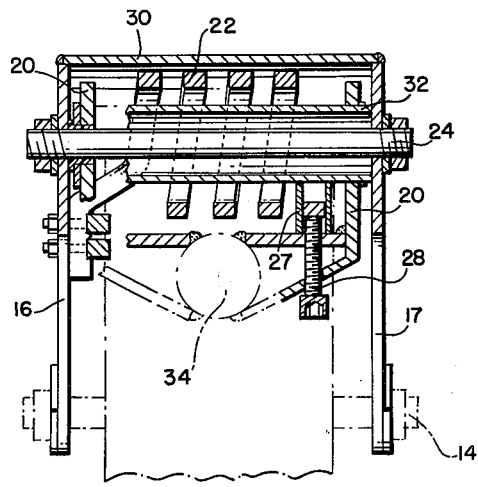
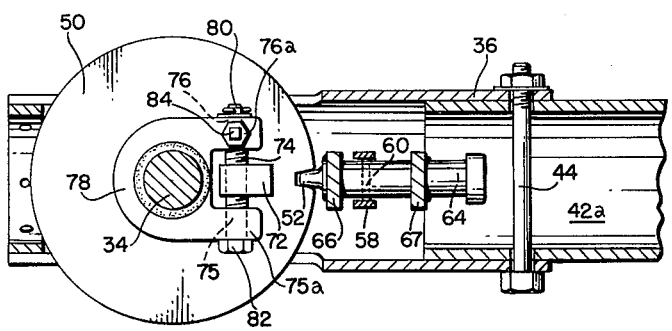
INVENTOR.
ABE ZAHA
BY
Smith & Tuck

United States Patent Office

3,098,257
Patented July 23, 1963

3,098,257
CASTER WHEEL FOR TRAILERS
Abe Zaha, Rte. 2, Box 310, Pendleton, Oreg.
Filed May 17, 1960, Ser. No. 29,692
2 Claims. (Cl. 16—35)

This present invention relates to the general art of automotive trailers and more particularly to a caster wheel intended for multiple use in supporting an automotive trailer.

More specifically this present invention consists of means employed with a caster wheel wherein the wheel can be locked against castering for high speed use on a highway and when it is desired to back the trailer means are provided for unlocking the holding device so that the fullest advantage can be taken of the caster wheel particularly when a plurality of them are used to support a single automotive trailer.

Automotive trailers are being increasingly employed for towing loads behind a passenger car. The greatest percentage of this use is by persons who use the trailer intermittently and therefore do not acquire the experience necessary to handle the trailer at high speed on the highway unless the trailer wheels are very accurately aligned to give proper tracking behind the towed vehicle and thus impart no disturbing effect to the towing vehicle. Probably the greatest difficulty experienced by the intermittent user of a trailer is in backing the same and most especially where the backing may be on a grade such as is experienced in launching a trailed boat.

This present invention provides means whereby the toe-in adjustment of the wheels can be accurately adjusted so that for high speed work on highways the wheels will accurately track behind the towed vehicle conforming to its general path on straightaways and on curves so that there will be no sloughing from one side to the other which is most disconcerting to the driver and has proven quite dangerous. Means are provided so that the caster wheel can be unlocked for backing purposes. This greatly facilitates the ease with which the trailer may be backed under normal conditions as there is no pronounced inclination for the wheels themselves to veer off in a direction in which they have been started and which effect largely accounts for the jack-knifing of trailers behind automobiles, especially in the hands of inexperienced drivers.

This present type of wheel is of special importance to trailers which have means for fixing the axis of the trailer with respect to the axis of the towing vehicle so that this relationship remains fixed during a backing operation. Such a trailer with its control means is shown in my co-pending U.S. patent application entitled "Automotive Trailer Having Caster Wheels," filed September 5, 1958, under Serial No. 759,266, and now Patent No. 2,949,317. This present application is a continuation-in-part of that application. It is believed that this present application provides means of general application to automotive trailers which tend to eliminate many of the undesirable features currently present in many of the existing trailers.

A principal object of this present invention therefore is to provide a caster wheel for automotive type trailers which can be locked against caster action for normal use on a highway when the towing vehicle is moving forward.

A further object of this invention is to provide locking means for a caster wheel which admits of precise alignment of the plane of the wheels of the trailer with the longitudinal axis of the towing vehicle. The locking means is provided as an individual locking means for each of the plurality of caster wheels employed and has the lock means so closely positioned and associated with the pivot shaft of the caster wheel that a very rigid positioning means is provided.

A further object is to provide precise adjusting means so that the toe-in of the wheels when they are locked for forward movement can be adjusted to meet the operational conditions and insure that the slight forward convergence required can be given to the planes of the wheels so as to promote steering stability.

A further object of this invention is to provide spring biased locking means which will insure the continuity of locking effort even though the control means for the locking elements should fail in use.

A further object of this invention is to provide means which insures the engagement of the locking means, after they have been separated, the first time the two locking elements are brought into a position of alignment.

Further objects, advantages and capabilities will be apparent from the description and disclosure in the drawings or may be comprehended or are inherent in the device.

FIGURE 1 is a side elevation of a caster wheel and the mounting means therefor made in accordance with this present invention.

FIGURE 2 is a fragmentary view in elevation taken along the line 2—2 of FIGURE 1.

FIGURE 3 is a vertical cross sectional view taken along the line 3—3 of FIGURE 1.

FIGURE 4 is a horizontal cross sectional view taken along the line 4—4 of FIGURE 2.

FIGURE 5 is a horizontal sectional view taken along the line 5—5 of FIGURE 3 excepting a modified form of bracket is illustrated.

FIGURE 6 is a cross sectional view taken along the line 6—6 of FIGURE 1.

Referring to the drawings, throughout which like reference characters indicate like parts the numeral 10 designates an automotive wheel. A wheel of this order is normally provided for use as, following this present invention, with a pneumatic tire 12. Wheel 10 is mounted for operation upon automotive type antifriction bearings 19 encased in bearing housing 15 which in turn are operatively mounted the horizontally disposed wheel spindle 14. Spindle 14 is supported at its opposite ends by the side bars 16 and 17 of the rearwardly inclined fork member 18. Fork 18 is operably coupled to housing member 20 by resilient means, one example of which is the torsion spring 22. Mechanically fork 18 is pivotably connected to housing 20 by the horizontal pivot shaft 24. When the torsion spring 22 is employed one end is fixedly secured as at 26 to one of the side members as 16 of fork 18. The other end is preferably adjustably secured to housing member 20 by means illustrated in FIGURE 4 which consists of the guideways 27 and the adjusting screw 28. It is desirable to guide a torsion spring of this order so as to confine it within reasonable bounds and for this purpose the curved portion 30 of fork 18 serves in part, and interiorly a tube 32 is used around shaft 24. Reasonable clearance must be provided for the wind-up and overrun as the spring is in use but beyond that need the spring should be restrained against distortion.

Housing 20 is secured to the vertically disposed revolvable pivot shaft 34. Shaft 34 provides the caster pivot for wheel 10 and therefore must be well supported as by the tubular bracket portion 36. This tube may extend out and be welded to a channel shaped bracket 38 which engages the trailer frame 40. Two forms of this bracket are indicated, one in FIGURE 2 and one in FIGURE 5. In one instance the connecting member 42 is welded as at 43 to bracket portion 36 with its other end welded to bracket 38. For certain uses it has been found desirable to have a modification of this arrangement in which tubular portion 42a may be welded to the channel member 38 but be removably connected to bracket portion 36 and secured in place as by bolt 44. This caster wheel assembly is intended for a wide variety of uses and for certain purposes it may be desirable to be able to easily remove the wheel assemblies as for instance in making repairs or changing a tire which may be very difficult to do under a wide low positioned trailer.

The normal position for the caster wheel and the one under which it is most generally used is in the forward moving and locked position. When, however, it is desired to back the trailer the caster action must be easily achieved and for this purpose it is desirable that shaft 34 be vertically disposed and a thrust washer or bearing 46 be provided to transfer the weight of the trailer from bracket 36 to the wheel assembly. Suitable, and preferably spaced bearings are provided for shaft 34 at 48 and 49.

When the caster wheel is used in its normally locked position it has been found very necessary that this locking means be one in which no slack can develop and which will hold the plane of the wheel in its adjusted position. A convenient means for providing a rigid lock is illustrated in FIGURES 3 and 5 in which a lock member 50 is mounted to turn with shaft 34. This lock member is provided preferably with a bevelled faced notch 52 which is adapted to receive a movable lock means as the bevelled lock pawl 54. Pawl 54 is spring biased into the locked position by the compression spring 56 and means are provided to overcome spring 56 by the lock releasing means which consists of lock release lever 58 which is pivotably secured to pawl 54 by means of pin 60 which passes through pawl 54 and the two portions of lever 58 which encircle pawl 54 and its housing 64. Pawl 54 is vertically slotted to permit the free movement of pin 60 and also of lever 58. As will be noted in FIGURES 3 and 5 pawl 54 is adequately contained in a slidable manner by the tubular housing 64 which is preferably welded in place to strut members 66 and 67. This arrangement insures that a rigid locking of shaft 34 will be maintained by the locking means throughout its normal expected life. When the tension member 70 is released spring 56 tends to seat pawl 54 and for this purpose it has been found that a disc is probably the preferred form for the notched lock member 50. When it is desired to lock the wheels the release means 70 is slacked off or shifted to the position as shown in FIGURE 3 and then the car driven ahead so that the caster wheels will align themselves with the axis of the trailer. Under this circumstance it is desirable that guide means be provided on each side of notch 52 so as to insure that the pawl will engage in notch 52 the first time the notch and pawl come into alignment and as noted it has been found that the disc shown is one of the better solutions of this guiding arrangement.

The present highways, especially the freeways, encourage high speeds even with the trailed loads and it is therefore very necessary that the caster wheels be provided with means so that they will have the desired amount of toe-in to provide the necessary slight forward convergence of the planes of the coacting caster wheels, on each side of the trailer, so as to promote precise steering stability. The loading and range of speeds that appear critical in the intended use of the trailer will cause a variation in the required toe-in displacement from the parallel arrangement and it has been found very desirable to provide a lockable and precise means for making this toe-in adjustment. Such a means is illustrated in FIGURES 3 and 5 and this may be very conveniently combined with the features of the present caster wheel.

A desirable type of toe-in adjusting means consists of having the lock member 50, of whatever form it may take, disposed on shaft 34 but not secured directly to it. The lock member is provided with an outstanding boss 72 which is preferably made as an integral part of it and to have the same threaded so as to accommodate the centrally threaded bolt 74. Bolt 74 has a smooth bearing portion 75 at the head end of the bolt and a reduced diameter unthreaded bearing portion 76 at the nut end of the bolt. However, no nut is provided and the bolt is held in the unthreaded bores within the toe-in adjusting member 78. Member 78 is fixedly secured to shaft 34 as by welding thereto and is provided with the outwardly extending bifurcated portion providing lugs 75a and 76a. Bolt 74 is held in place by washer and cotter key means at 80. As bolt 74 is held against longitudinal movement but is free to revolve within bores 75 and 76, it may be turned by means of bolt head 82 to adjust the angular relationship between lock member 50 and shaft 34. This adjustment controls the positioning of the plane of the wheel with respect to the longitudinal axis of the trailer and thus establishes and maintains the toe-in adjustment. A set screw 84 provided with a lock nut locks bolt 74 against turning and thus secures the adjustment for toe-in of the wheels 10.

It is believed that it will be clearly apparent from the above description and the disclosure in the drawings that the invention comprehends a novel construction of caster wheel for trailers.

Having thus disclosed my invention, I claim:

1. A caster wheel for use on automotive type trailers, comprising: an automotive type wheel having bearings thereon and disposed to operatively support said wheel; an inclined fork for supporting said spindle; a revolvable, vertically disposed shaft having a housing member secured to its lower end; a supporting bracket for said revolvable shaft adapted to be secured to the frame of a trailer, said housing having horizontal pivot means for supporting said fork; resilient means operatively connecting said fork and said housing to provide a resilient operational support for said wheel; locking means composed of a rigid spring biased lock pawl and a notched member disposed for limited rotation on said vertical shaft to normally prevent caster action of said wheel; flexible tension means for remotely disengaging said locking means; and a movable toe-in adjusting means for said wheel to secure said notched member and said vertical shaft in adjusted angular relationship.

2. A caster wheel for use on automotive type trailers, comprising: an automotive type wheel having a pneumatic tire thereon, a horizontal wheel spindle having bearings thereon and disposed to operatively support said wheel; an inclined fork for supporting said spindle; a revolvable, vertically disposed shaft having a housing member secured to its lower end; a supporting bracket for said revolvable shaft adapted to be secured to the frame of a trailer, said housing having horizontal pivot means for supporting said fork; resilient means operatively connecting said fork and said housing; locking means for said vertical shaft to normally prevent caster action of said wheel; said locking means composed of a notched member disposed for limited rotation on said vertical shaft and a rigid spring biased lock pawl member; flexible tension means for remotely disengaging said locking means; a movable toe-in adjusting means for securing said notched member and said vertical shaft in adjusted angular relationship; and said adjusting means composed of an outstanding boss on said notched member; a coacting toe-in adjusting member fixedly secured to said shaft and bifurcated to provide spaced apart lugs disposed on each side of said outstanding boss with clearance permitting an adequate range of angular adjustment between said vertical shaft and said adjusting means, and means threadedly engaging said boss for securing said shaft and said outstanding boss in adjusted position.

References Cited in the file of this patent
UNITED STATES PATENTS

| | | |
|---|---|---|
| 318,323 | Teetzel | May 19, 1885 |
| 784,057 | Lovelace | Mar. 7, 1905 |
| 1,237,507 | Gregory | Aug. 21, 1917 |
| 2,376,001 | Nogle | May 15, 1945 |
| 2,422,892 | Forbes et al. | June 24, 1947 |
| 2,472,686 | Snyder | June 7, 1949 |
| 2,515,704 | Gardiner | July 18, 1950 |
| 2,537,521 | Forbes | Jan. 9, 1951 |
| 2,831,699 | Holmes | Apr. 22, 1958 |